(12) United States Patent
Hu et al.

(10) Patent No.: US 10,070,070 B2
(45) Date of Patent: Sep. 4, 2018

(54) VIDEO PROCESSING APPARATUS WITH TRANSFORM UNIT SIZE SELECTION, MODE INFORMATION UNIT SIZE SELECTION AND/OR PICTURE WIDTH/HEIGHT DECISION, AND RELATED VIDEO PROCESSING METHOD THEREOF

(71) Applicant: MEDIATEK INC., Hsin-Chu (TW)

(72) Inventors: Meng-Jye Hu, Taoyuan (TW); Yung-Chang Chang, New Taipei (TW); Chia-Yun Cheng, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 380 days.

(21) Appl. No.: 14/722,162

(22) Filed: May 27, 2015

(65) Prior Publication Data

US 2015/0350566 A1     Dec. 3, 2015

Related U.S. Application Data

(60) Provisional application No. 62/003,612, filed on May 28, 2014.

(51) Int. Cl.
*H04B 1/66* (2006.01)
*H04N 5/262* (2006.01)
*H04N 19/159* (2014.01)
*H04N 19/176* (2014.01)
*H04N 19/70* (2014.01)
*H04N 19/122* (2014.01)
*H04N 19/136* (2014.01)

(52) U.S. Cl.
CPC ......... *H04N 5/2628* (2013.01); *H04N 19/122* (2014.11); *H04N 19/136* (2014.11); *H04N 19/159* (2014.11); *H04N 19/176* (2014.11); *H04N 19/70* (2014.11)

(58) Field of Classification Search
CPC .... H04N 19/159; H04N 19/176; H04N 19/70; H04N 19/122; H04N 19/136
See application file for complete search history.

(56) References Cited

U.S. PATENT DOCUMENTS

2014/0301464 A1* 10/2014 Wu .................. H04N 19/105
375/240.15

FOREIGN PATENT DOCUMENTS

| CN | 1678024 A | 10/2005 |
| CN | 101605206 A | 12/2009 |
| KR | 1020110077825 A | 7/2011 |

OTHER PUBLICATIONS

International application No. PCT/CN2015/080114, International filing date: May 28, 2015, International Searching Report dated Aug. 27, 2015.

* cited by examiner

*Primary Examiner* — Sathyanaraya V Perungavoor
*Assistant Examiner* — Peet Dhillon
(74) *Attorney, Agent, or Firm* — Winston Hsu (57) ABSTRACT

One exemplary video processing apparatus includes a control circuit and a size selection circuit. The control circuit determines picture boundary information. The size selection circuit refers to at least the picture boundary information to select a size for a block associated with encoding of a picture, wherein selection of the size is constrained by the picture boundary information to ensure that the block with the selected size is not across a picture boundary of the picture.

21 Claims, 8 Drawing Sheets

FIG. 8 ically, to a video processing apparatus with transform unit size selection, mode information unit size selection and/or picture width/height decision, and a related video processing method thereof.

VIDEO PROCESSING APPARATUS WITH TRANSFORM UNIT SIZE SELECTION, MODE INFORMATION UNIT SIZE SELECTION AND/OR PICTURE WIDTH/HEIGHT DECISION, AND RELATED VIDEO PROCESSING METHOD THEREOF

CROSS REFERENCE TO RELATED APPLICATIONS

This application claims the benefit of U.S. provisional application No. 62/003,612, filed on May 28, 2014 and incorporated herein by reference.

BACKGROUND

The present invention relates to video processing (e.g., video encoding), and more particularly, to a video processing apparatus with transform unit size selection, mode information unit size selection and/or picture width/height decision, and a related video processing method thereof.

The conventional video coding standards generally adopt a block based coding technique to exploit spatial and temporal redundancy. For example, the basic approach is to divide the whole source picture into a plurality of blocks, perform intra/inter prediction on each block, transform residues of each block, and perform quantization and entropy encoding. Besides, a reconstructed picture is generated in a coding loop to provide reference pixel data used for coding following blocks. For certain video coding standards, in-loop filter(s) may be used for enhancing the image quality of the reconstructed picture.

The intra prediction unit and the inter prediction unit in a video encoder are used to generate predicted pixels/samples needed for generating reconstructed pictures serving as reference pictures. For certain video coding standards, the intra prediction of a current block (i.e., a current transform unit) being encoded requires reconstructed pixels of previously reconstructed block(s). If the current block is across a picture boundary, neighbor pixel padding is needed at the picture boundary to create above or left padded pixels of the current block that are outside the picture boundary.

Hence, there is a need for an innovative video encoder design which can avoid padding above or left neighbor pixels of the current block at the picture boundary before doing intra prediction.

SUMMARY

One of the objectives of the claimed invention is to provide a video processing apparatus with transform unit size selection, mode information unit size selection and/or picture width/height decision, and a related video processing method thereof.

According to a first aspect of the present invention, an exemplary video processing apparatus is disclosed. The exemplary video processing apparatus include a control circuit and a size selection circuit. The control circuit is arranged to determine picture boundary information. The size selection circuit is arranged to refer to at least the picture boundary information to select a size for a block associated with encoding of a picture, wherein selection of the size is constrained by the picture boundary information to ensure that the block with the selected size is not across a picture boundary of the picture.

According to a second aspect of the present invention, an exemplary video processing apparatus is disclosed. The exemplary video processing apparatus includes a picture width decision circuit and a picture height decision circuit. The picture width decision circuit is arranged to refer to a display width to decide a picture width of a picture to be encoded. The picture height decision circuit is arranged to refer to a display height to decide a picture height of the picture to be encoded. The picture width is set by extending the display width to a nearest value that is an integer multiple of a superblock (SB) side length, or the picture height is set by extending the display height to a nearest value that is an integer multiple of the SB side length.

According to a third aspect of the present invention, an exemplary video processing method is disclosed. The exemplary video processing method includes: determining picture boundary information; and utilizing a size selection circuit to refer to at least the picture boundary information to select a size for a block associated with encoding of a picture, wherein selection of the size is constrained by the picture boundary information to ensure that the block with the selected size is not across a picture boundary of the picture.

According to a fourth aspect of the present invention, an exemplary video processing method is disclosed. The exemplary video processing method includes: utilizing a picture width decision circuit for referring to a display width to decide a picture width of a picture to be encoded; and utilizing a picture height decision circuit for referring to a display height to decide a picture height of the picture to be encoded, wherein the picture width is set by extending the display width to a nearest value that is an integer multiple of a superblock (SB) side length, or the picture height is set by extending the display height to a nearest value that is an integer multiple of the SB side length.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
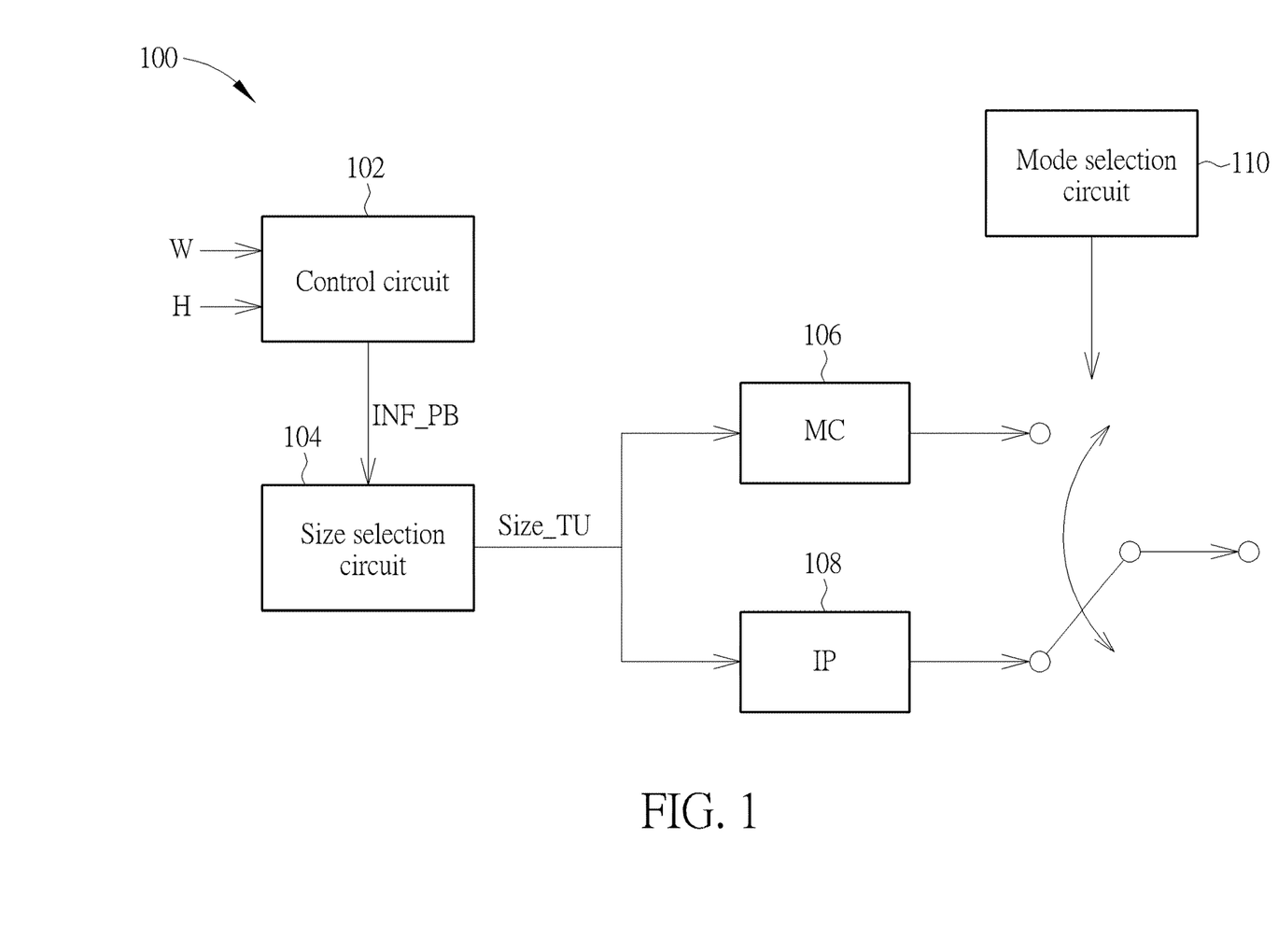
FIG. 1 is a diagram of a video processing apparatus according to a first embodiment of the present invention.

FIG. 1 is a diagram of a video processing apparatus according to a first embodiment of the present invention. The video processing apparatus 100 may be part of an electronic device, such as a personal computer (e.g., a laptop computer or a desktop computer), a mobile phone, a tablet, or a wearable device. The video processing apparatus 100 may include at least a portion (i.e., part or all) of a video encoder for encoding raw pictures to generate a video sequence composed of a plurality of consecutive encoded pictures. At least a portion of the video processing apparatus 100 may be implemented in an integrated circuit (IC). To put it simply, any electronic device or electronic system using the proposed video processing apparatus 100 falls within the scope of the present invention.

As shown in FIG. 1, the video processing apparatus (e.g., partial video encoder) 100 includes a control circuit 102, a size selection circuit 104, a motion compensation circuit (denoted as "MC") 106, an intra prediction circuit (denoted as "IP") 108, and a mode selection circuit 110. The mode selection circuit 110 is used to decide a prediction mode of a current block. For example, when the prediction mode of the current block is decided to be inter prediction, predicted pixels/samples generated from the motion compensation circuit 106 are output to the following encoding stage, such as a reconstruct circuit (not shown). For another example, when the prediction mode of the current block is decided to be intra prediction, predicted pixels/samples generated from the intra prediction circuit 108 are output to the following encoding stage, such as the reconstruct circuit (not shown).

VP9 coding standard is an open and royalty-free video coding standard being developed by Google®. In this embodiment, each of the motion compensation circuit 106 and the intra prediction circuit 108 may be configured to support VP9 encoding. VP9 divides one picture into 64×64-sized blocks that are called superblocks $SB_{64\times64}$. Superblocks $SB_{64\times64}$ of the picture are processed in raster order: left to right, top to bottom. In addition, VP9 supports quad-tree based encoding. Hence, recursive partitioning may be employed to split each superblock $SB_{64\times64}$ into one or more partitions (e.g., smaller-sized blocks) for further processing. For example, one superblock $SB_{64\times64}$ may be split into one or more coding units (or called mode information (MI) units), where the subdivision partitions supported by VP9 coding standard may include square partitions, such as a 64×64-sized block, a 32×32-sized block, a 16×16-sized block, a 8×8-sized block, and may further include non-square partitions, such as a 64×32-sized block, a 32×64-sized block, 32×16-sized block, a 16×32-sized block, . . . , a 8×8-sized block. Hence, the possible coding unit (MI unit) sizes may include 64×64, 32×32, 16×16, 8×8, 64×32, 32×64, 32×16, 16×32, . . . , 8×8. Each of the coding units (MI units) may be further split into one or more transform units (TUs), each having a TU size selected from a group consisted of 32×32, 16×16, 8×8 and 4×4.

Intra prediction in VP9 follows the transform block partitions. In other words, intra prediction may be performed at 4 different scales (i.e., 4×4, 8×8, 16×16 and 32×32) determined by the TU size used. Thus, intra prediction operations are applied to square transform blocks each having one of the possible TU sizes 4×4, 8×8, 16×16 and 32×32. For example, one 16×8 block with 8×8 transforms will result in two 8×8 intra prediction operations. VP9 uses a total of 10 different intra prediction options, including H_PRED (horizontal prediction), V_PRED (vertical prediction), DC_PRED (DC prediction), TM_PRED (TrueMotion prediction), and 6 angular prediction modes.

Figure 2:
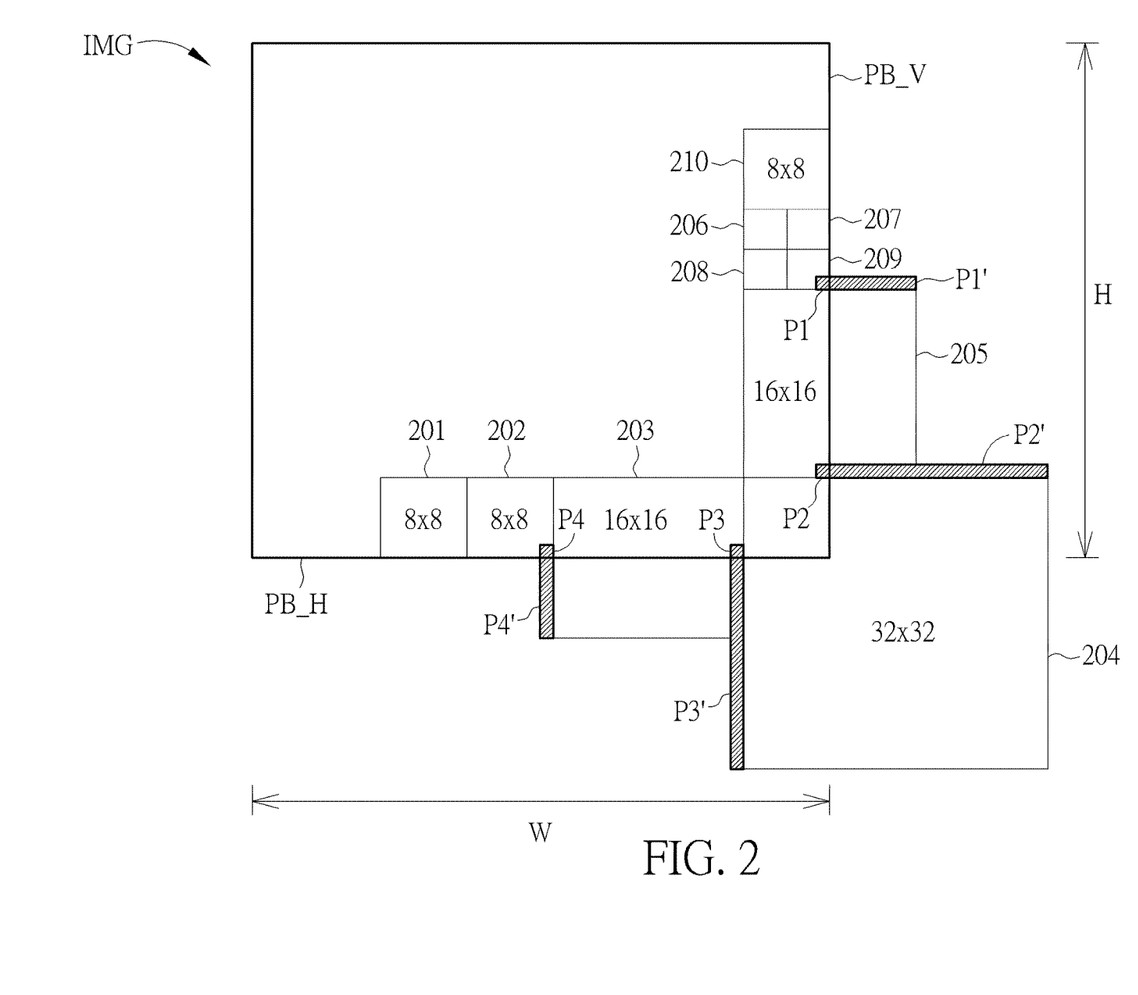
FIG. 2 is a diagram illustrating a pixel padding example.

Like other coding standards, VP9's intra prediction of a current block requires two one-dimensional arrays that contain the left reconstructed pixels and the above reconstructed pixels belonging to the neighbor blocks. However, in accordance with the VP9 coding standard, there is no limitation to intra prediction at the picture boundary. Hence, all of the TU sizes 4×4, 8×8, 16×16 and 32×32 are allowed at the picture boundary, where the picture boundary specified by VP9 is equal to the display boundary extending to the nearest value that is an integer multiple of 8. In a typical VP9 encoder design, there is a need to perform neighbor pixel padding for a transform block across the picture boundary before doing intra prediction. FIG. 2 is a diagram illustrating a pixel padding example. The transform blocks 206-209 have the same TU size of 4×4. The transform blocks 201, 202 and 210 have the same TU size of 8×8. The transform blocks 203 and 205 have the same TU size of 16×16. The transform block 204 has the TU size of 32×32. The picture IMG to be encoded has a picture width W and a picture height H. In addition, the picture boundary of the picture IMG includes a picture vertical boundary PB_V and a picture horizontal boundary PB_H, where the picture vertical boundary PB_V is equal to a display vertical boundary extending to the nearest value that is an integer multiple of 8, and the picture horizontal boundary PB_V is equal to a display horizontal boundary extending to the nearest value that is an integer multiple of 8. As shown in FIG. 2, the transform blocks 207, 209, and 210 are on the picture vertical boundary PB_V, and the transform blocks 201 and 202 are on the picture horizontal boundary PB_H. However, the transform block 205 is across the picture vertical boundary PB_V, the transform block 203 is across the picture horizontal boundary PB_H, and the transform block 204 is across both of the picture horizontal boundary PB_H and the picture vertical boundary PB_V.

As mentioned above, VP9's intra prediction of a current block requires two one-dimensional arrays that contain the left reconstructed pixels and the above reconstructed pixels belonging to the neighbor blocks. With regard to the transform block 205 that is across the picture vertical boundary PB_V, a portion of an above array of reconstructed pixels is not available. Hence, a reconstructed boundary pixel P1 on the picture vertical boundary PB_V is copied to form a plurality of padded pixels P1' outside the picture boundary PB, where the reconstructed boundary pixel P1 and the padded pixels P1' correspond to the same row. With regard to the transform block 204 that is across the picture horizontal boundary PB_H and the picture vertical boundary PB_V, a portion of an above array of reconstructed pixels is not available, and a portion of a left array of reconstructed pixels is not available. Hence, a reconstructed boundary pixel P2 on the picture vertical boundary PB_V is copied to form a plurality of padded pixels P2' outside the picture vertical boundary PB_V, where the reconstructed boundary pixel P2 and the padded pixels P2' correspond to the same row. In addition, a reconstructed boundary pixel P3 on the picture horizontal boundary PB_H is copied to form a plurality of padded pixels P3' outside the picture horizontal boundary PB_H, where the reconstructed boundary pixel P3 and the padded pixels P3' correspond to the same column.

With regard to the transform block 203 that is across the picture horizontal boundary PB_H, a portion of a left array of reconstructed pixels is not available. Hence, a reconstructed boundary pixel P4 on the picture horizontal boundary PB_H is copied to form a plurality of padded pixels P4' outside the picture horizontal boundary PB_H, where the reconstructed boundary pixel P4 and the padded pixels P4' correspond to the same column.

As can be seen from FIG. 2, if the transform block 205 is replaced by smaller-sized transform block(s) (e.g., two 8×8 transform blocks arranged vertically on the picture vertical boundary PB_V), no padding for above neighbor pixels is needed for intra prediction of each smaller-sized transform block. Similarly, if the transform block 204 is replaced by smaller-sized transform block(s) (e.g., one 8×8 transform block located at the bottom-right corner of the picture), no padding for above and left neighbor pixels is needed for intra prediction of each smaller-sized transform block. If the transform block 203 is replaced by smaller-sized transform block(s) (e.g., two 8×8 transform blocks arranged horizontally on the picture horizontal boundary PB_H), no padding for left neighbor pixels is needed for intra prediction of each smaller-sized transform block. Based on such observation, the present invention therefore proposes a modified TU size selection scheme to take the place of the typical TU size selection scheme (which has no limitation to intra prediction at the picture boundary) to thereby avoid performing above or left neighbor pixel padding at the picture boundary before doing intra prediction. Further details of the proposed TU size selection scheme are described as below.

The proposed TU size selection scheme is achieved through the size selection circuit 104 collaborating with the control circuit 102. The control circuit 102 is arranged to determine picture boundary information INF_PB. The size selection circuit 104 is arranged to refer to at least the picture boundary information INF_PB to select a size for a block (e.g., a TU size Size_TU for a transform unit) associated with encoding of a picture, wherein selection of the TU size Size_TU is constrained by the picture boundary information INF_PB to ensure that the transform unit with the selected TU size is not across the picture boundary of the picture (e.g., the transform unit with the selected TU size is exactly on the picture boundary of the picture).

In this embodiment, the control circuit 102 may set the picture boundary information INF_PB based on a width W of the picture, a height H of the picture, and position-related information of an MI unit (which needs to be sub-divided into one or more transform units for intra prediction), where the picture boundary information INF_PB indicates whether the MI unit is across the picture boundary. For example, the picture boundary information INF_PB may be implemented using a cross horizontal boundary flag MI_h_cross_boundary_flag and a cross vertical boundary flag MI_v_cross_boundary_flag. The position-related information of the MI unit being currently encoded may include a start X-axis position XL, an end X-axis position XH, a start Y-axis position YL, and an end Y-axis position YH, where XH>XL and YH>YL. Specifically, the upper-left corner of the MI unit is located at (XL, YH), the upper-right corner of the MI unit is located at (XH, YH), the bottom-left corner of the MI unit is located at (XL, YL), and the bottom-right corner of the MI unit is located at (XH, YL). The picture width W and the picture height H of the picture may be determined based on the display width and the display height of the display region, respectively. The operation of setting the cross horizontal boundary flag MI_h_cross_boundary_flag may be represented by the following pseudo code.

```
If (XL < W) && (XH > W)
    MI_h_cross_boundary_flag = 1
else
    MI_h_cross_boundry_flag = 1
```

The operation of setting the cross vertical boundary flag MI_v_cross_boundary_flag may be represented by the following pseudo code.

```
If (YL < H) && (YH > H)
    MI_v_cross_boundary_flag = 1
else
    MI_v_cross_boundary_flag = 0
```

It should be noted that the above example is not meant to be a limitation of the present invention. In an alternative design, the control circuit 102 may be configured to use a different computation algorithm for setting the picture boundary information INF_PB to indicate whether the MI unit is across the picture boundary.

Figure 3:
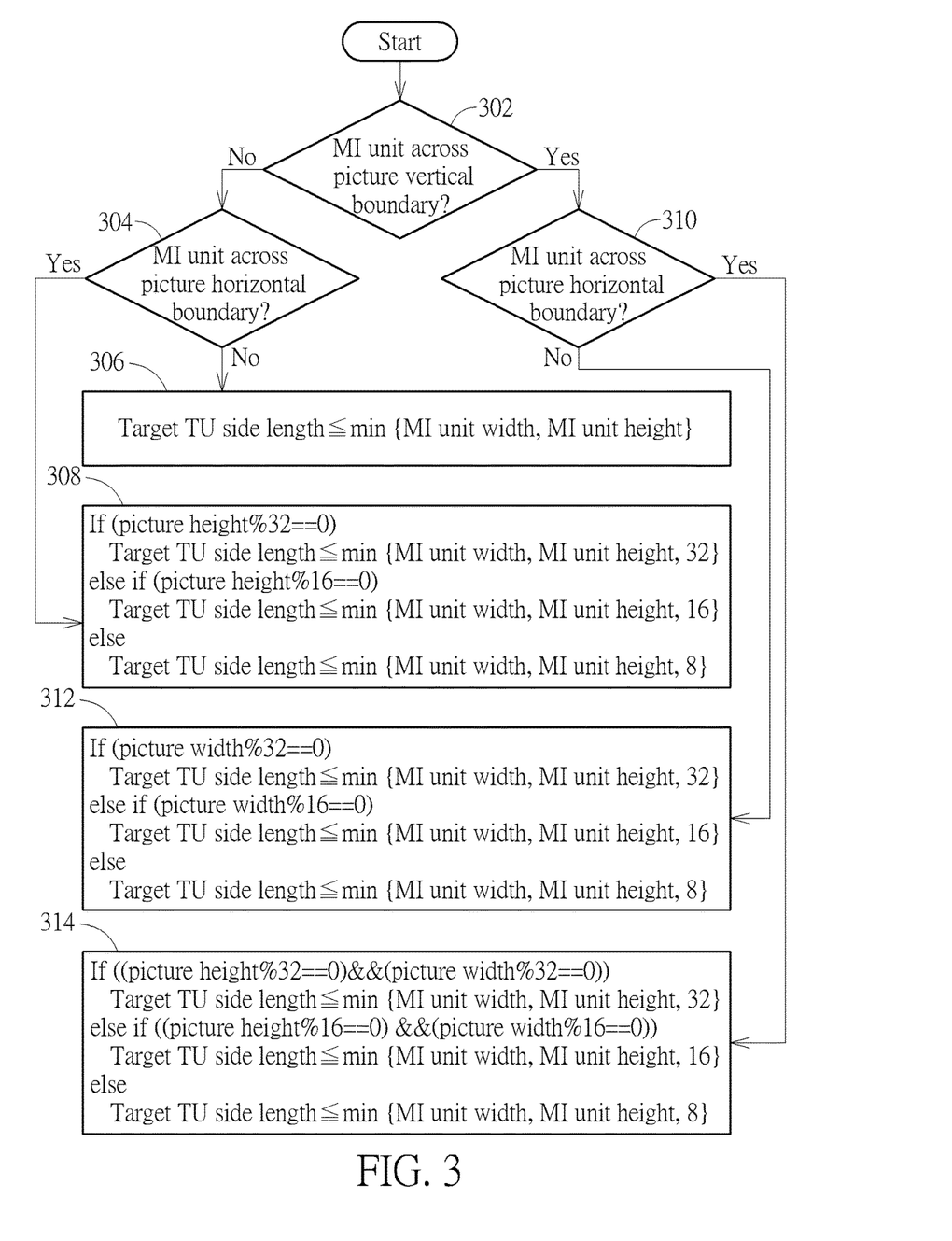
FIG. 3 is a flowchart illustrating a transform unit size selection method according to an embodiment of the present invention.

FIG. 3 is a flowchart illustrating a TU size selection method according to an embodiment of the present invention. Provided that the result is substantially the same, the steps are not required to be executed in the exact order shown in FIG. 3. The TU size selection method may be employed by the size selection circuit 104. The size selection circuit 104 determines the TU size of transform units inside the MI unit based at least partly on the picture boundary information INF_PB. In step 302, the size selection circuit 104 refers to the picture boundary information INF_PB (which may include cross horizontal boundary flag MI_h_cross_boundary_flag and cross vertical boundary flag MI_v_cross_boundary_flag) to determine if the MI unit is across the picture vertical boundary (e.g., PB_V shown in FIG. 2). When the cross vertical boundary flag MI_v_cross_boundary_flag indicates that the MI unit is across the picture vertical boundary (i.e., MI_v_cross_boundary_ flag=1), the flow proceeds with step 310. When the cross vertical boundary flag MI_v_cross_boundary_flag indicates that the MI unit is fully inside the picture vertical boundary (i.e., MI_v_cross_boundary_flag=0), the flow proceeds with step 304.

In step 304, the size selection circuit 104 further refers to the picture boundary information INF_PB (which may include cross horizontal boundary flag MI_h_cross_boundary_flag and cross vertical boundary flag MI_v_cross_boundary_flag) to determine if the MI unit is across the picture horizontal boundary (e.g., PB_H shown in FIG. 2). When the cross horizontal boundary flag MI_h_cross_boundary_flag indicates that the MI unit is across the picture horizontal boundary (i.e., MI_h_cross_boundary_ flag=1), the flow proceeds with step 308. When the cross horizontal boundary flag MI_h_cross_boundary_flag indicates that the MI unit is fully inside the picture horizontal boundary (i.e., MI_h_cross_boundary_flag=0), the flow proceeds with step 306.

As mentioned above, VP9 specifies that one MI unit may be split into one or more transform units, each having a TU size selected from a group consisted of 32×32, 16×16, 8×8 and 4×4. Hence, one transform unit must be a square partition having a side length selected from 32, 16, 8, and 4, where the width and the height of the transform unit are equal to the same side length. Further, the transform unit defined in the MI unit must be equal to or smaller than the MI unit, and the MI unit may be a square partition or a non-square partition. Hence, the selectable TU sizes depend on the minimum of a width of the MI unit and a height of the MI unit. That is, not all of the possible TU sizes 32×32, 16×16, 8×8 and 4×4 are selectable under each MI unit size. In step 306, the side selection circuit 104 selects a target TU side length from selectable candidate TU side length(s), each being equal to or smaller than a minimum among a width of the MI unit and a height of the MI unit.

In step 308, an additional limitation may be imposed on the possible TU sizes 32×32, 16×16, 8×8 and 4×4 to decide selectable TU size(s), so as to ensure that a transform unit with a finally-selected TU size is not across the picture horizontal boundary. For example, the size selection circuit 104 checks if a height H of the picture is divisible by at least one first candidate TU side length (e.g., 32 or 16) to generate a checking result, and decides a target TU side length selected for setting the TU size according to the checking result and a size of the MI unit. When the checking result indicates that the height H of the picture is divisible by a first candidate TU side length (e.g., 32 or 16), the size selection circuit 104 selects the target TU side length from at least one selectable candidate TU side length, each being equal to or smaller than a minimum among the first candidate TU side length (e.g., 32 or 16), a width of the MI unit, and a height of the MI unit. However, when the checking result indicates that the height H of the picture is not divisible by each first candidate TU side length (e.g., 32 and 16), the size selection circuit 104 selects the target TU side length from at least one selectable candidate TU side length, each being equal to or smaller than a minimum among a second candidate TU side length (e.g., 8), the width of the MI unit, and the height of the MI unit, where the second candidate TU side length (e.g., 8) is smaller than each first candidate TU side length (e.g., 32 and 16).

In step 310, the size selection circuit 104 refers to the picture boundary information INF_PB (which may include cross horizontal boundary flag MI_h_cross_boundary_flag and cross vertical boundary flag MI_v_cross_boundary_flag) to determine if the MI unit is across the picture horizontal boundary (e.g., PB_H shown in FIG. 2). When the cross horizontal boundary flag MI_h_cross_boundary_flag indicates that MI unit is across the picture horizontal boundary (i.e., MI_h_cross_boundary_flag=1), the flow proceeds with step 314. When the cross horizontal boundary flag MI_h_cross_boundary_flag indicates that MI unit is fully inside the picture horizontal boundary (i.e., MI_h_cross_boundary_flag=0), the flow proceeds with step 312.

In step 312, an additional limitation may be imposed on the possible TU sizes 32×32, 16×16, 8×8 and 4×4 to decide selectable TU size(s), so as to ensure that a transform unit with a finally-selected TU size is not across the picture vertical boundary. For example, the size selection circuit 104 checks if a width W of the picture is divisible by at least one first candidate TU side length (e.g., 32 or 16) to generate a checking result, and decides a target TU side length selected for setting the TU size according to the checking result and a size of the MI unit. When the checking result indicates that the width W of the picture is divisible by a first candidate TU side length (e.g., 32 or 16), the size selection circuit 104 selects the target TU side length from at least one selectable candidate TU side length, each being equal to or smaller than a minimum among the first candidate TU side length (e.g., 32 or 16), a width of the MI unit, and a height of the MI unit. However, when the checking result indicates that the width W of the picture is not divisible by each first candidate TU side length (e.g., 32 and 16), the size selection circuit 104 selects the target TU side length from at least one selectable candidate TU side length, each being equal to or smaller than a minimum among a second candidate TU side length (e.g., 8), the width of the MI unit, and the height of the MI unit, where the second candidate TU side length (e.g., 8) is smaller than each first candidate TU side length (e.g., 32 and 16).

In step 314, an additional limitation may be imposed on the possible TU sizes 32×32, 16×16, 8×8 and 4×4 to decide selectable TU size(s), so as to ensure that a transform unit with a finally-selected TU size is not across the picture vertical boundary. For example, the size selection circuit 104 checks if a height H and a width W of the picture are both divisible by the same candidate TU side length (i.e., at least one first candidate TU side length, such as 32 or 16) to generate a checking result, and decides a target TU side length selected for setting the TU size according to the checking result and a size of the MI unit. When the checking result indicates that the height H and the width W of the picture are both divisible by a first candidate TU side length (e.g., 32 or 16), the size selection circuit 104 selects the target TU side length from at least one selectable candidate TU side length, each being equal to or smaller than a minimum among the first candidate TU side length (32 or 16), a width of the MI unit, and a height of the MI unit. However, when the checking result indicates that the height H and the width W of the picture are not both divisible by each first candidate TU side length (e.g., 32 and 16), the size selection circuit 104 selects the target TU side length from at least one selectable candidate TU side length, each being equal to or smaller than a minimum among a second candidate TU side length (e.g., 8), the width of the MI unit, and the height of the MI unit, where the second candidate TU side length (e.g., 8) is smaller than each first candidate TU side length (e.g., 32 and 16).

In a case where there is no limitation to intra prediction at the picture boundary, all of the TU sizes 4×4, 8×8, 16×16 and 32×32 are allowed at the picture boundary. To avoid padding above or left neighbor pixels at the picture boundary before doing intra prediction, the video processing apparatus 100 in FIG. 1 uses the size selection circuit 104 to properly control the TU size selection. However, this is for illustrative purposes only, and is not meant to be a limitation of the present invention. In an alternative design, an MI unit size of a boundary MI unit that is inside a superblock and is nearest to a picture boundary of a picture can be properly controlled to achieve the same objective of avoiding neighbor pixel padding at the picture boundary before doing intra prediction.

Figure 4:
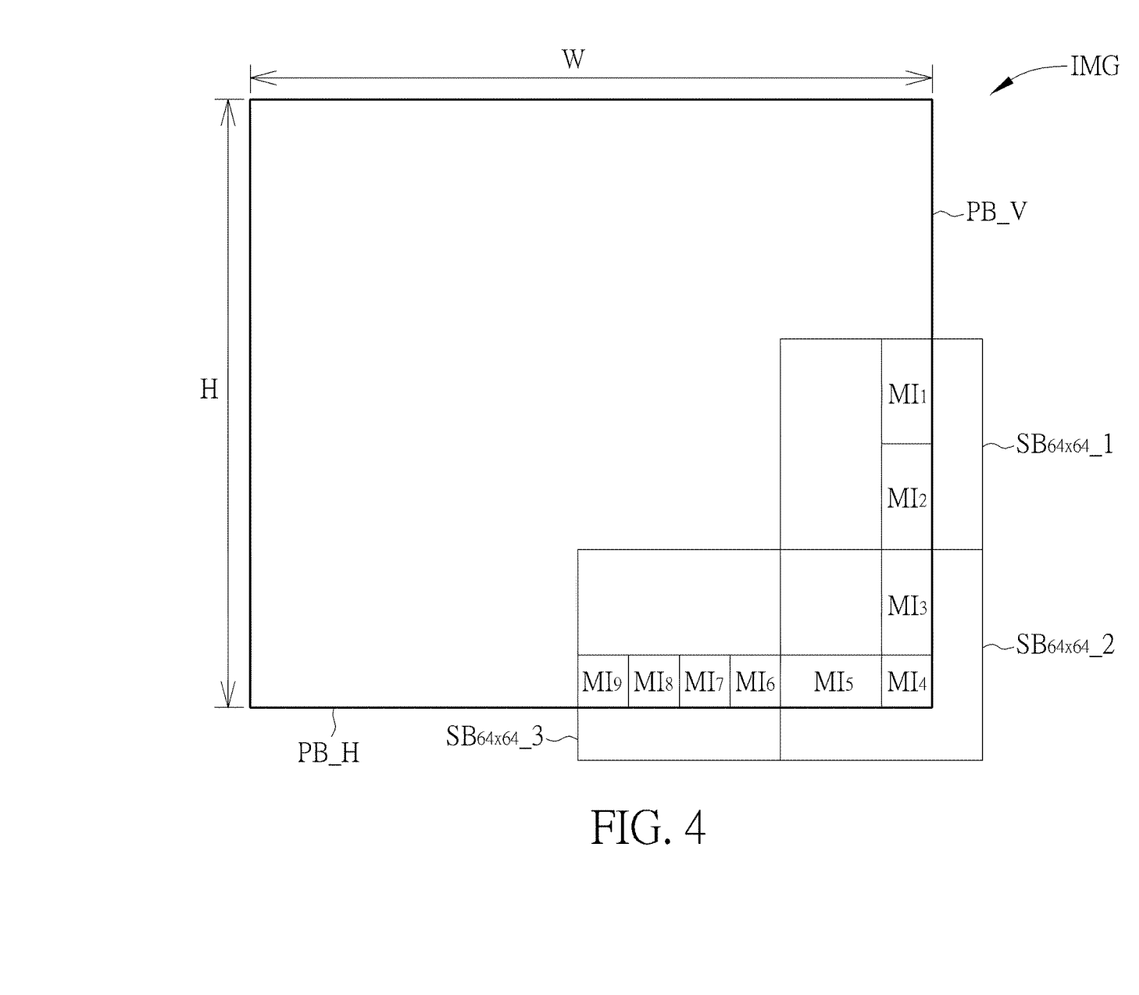
FIG. 4 is a diagram illustrating an example of dividing a picture into 64×64-sized blocks (or called superblocks).

FIG. 4 is a diagram illustrating an example of dividing a picture into 64×64-sized blocks (or called superblocks). The picture IMG to be encoded has a picture width W and a picture height H. In addition, the picture boundary of the picture IMG includes a picture vertical boundary PB_V and a picture horizontal boundary PB_H. The picture boundary is equal to the display boundary extending to the nearest value that is an integer multiple of 8. Hence, the picture vertical boundary PB_V is equal to the display vertical boundary extending to the nearest value that is an integer multiple of 8, and the picture horizontal boundary PB_V is equal to the display horizontal boundary extending to the nearest value that is an integer multiple of 8. For clarity and simplicity, only three superblocks are shown in FIG. 4, where the superblock $SB_{64\times64}\_1$ is across the picture vertical boundary PB_V, the superblock $SB_{64\times64}\_2$ is across both of the picture vertical boundary PB_V and the picture horizontal boundary PB_H, and the superblock $SB_{64\times64}\_3$ is across the picture horizontal boundary PB_H. As mentioned above, one MI unit may be split into one or more transform blocks, each having a TU size selected from a group consisted of 32×32, 16×16, 8×8 and 4×4. Hence, if the MI unit sizes are properly selected to ensure that the MI units $MI_1$-$MI_9$ (which are boundary MI units nearest to the picture boundary) are not across the picture boundary, any transform unit defined in each of the MI units $MI_1$-$MI_9$ is ensured to be fully inside the picture boundary, thus requiring no neighbor pixel padding before doing intra prediction. Based on such observation, the present invention therefore proposes a modified MI unit size selection scheme to take the place of the typical MI unit size selection scheme to thereby avoid boundary MI units nearest to the picture boundary from being across the picture boundary. Further details of the proposed MI unit size selection scheme are described as below.

Figure 5:
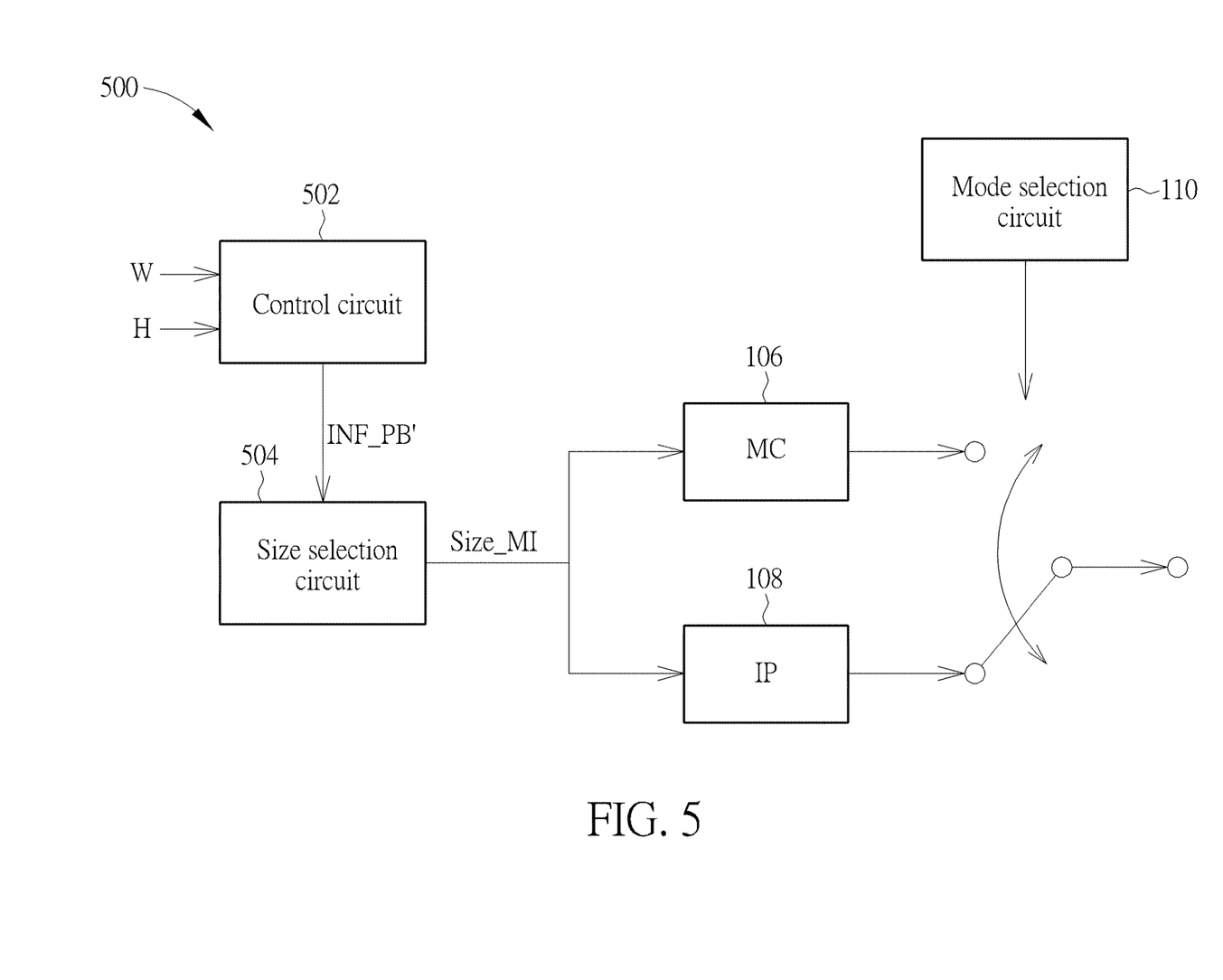
FIG. 5 is a diagram of a video processing apparatus according to a second embodiment of the present invention.

FIG. 5 is a diagram of a video processing apparatus according to a second embodiment of the present invention. The video processing apparatus 500 may be part of an electronic device, such as a personal computer (e.g., a laptop computer or a desktop computer), a mobile phone, a tablet, or a wearable device. The video processing apparatus 500 may include at least a portion (i.e., part or all) of a video encoder for encoding raw pictures to generate a video sequence composed of a plurality of consecutive encoded pictures. At least a portion of the video processing apparatus 500 may be implemented in an integrated circuit (IC). To put it simply, any electronic device or electronic system using the proposed video processing apparatus 500 falls within the scope of the present invention.

The proposed MI unit size selection scheme is achieved through the size selection circuit 504 collaborating with the control circuit 502. The control circuit 502 is arranged to determine picture boundary information INF_PB'. The size selection circuit 504 is arranged to refer to at least the picture boundary information INF_PB' to select a size for a block (e.g., an MI unit size Size_MI for an MI unit) associated with encoding of a picture, wherein selection of the MI unit size Size_MI is constrained by the picture boundary information INF_PB' to ensure that the MI unit with the selected MI unit size is not across the picture boundary of the picture (e.g., the MI unit with the selected MI unit size is on the picture boundary of the picture).

The major difference between the video processing apparatuses 100 and 500 is the design of the control circuit and size selection circuit. In this embodiment shown in FIG. 5, the control circuit 502 may set the picture boundary information INF_PB' based on a width W of the picture, a height H of the picture, and position-related information of a superblock (which may be sub-divided into one or more MI units), where the picture boundary information INF_PB' indicates whether the superblock is across the picture boundary. In this embodiment, the picture boundary information INF_PB' may be implemented using a cross horizontal boundary flag SB_h_cross_boundary_flag and a cross vertical boundary flag SB_v_cross_boundary_flag. For example, the position-related information of the superblock being currently encoded may include a start X-axis position XL', an end X-axis position XH', a start Y-axis position YL', and an end Y-axis position YH', where XH'>XL' and YH'>YL'. Specifically, the upper-left corner of the superblock is located at (XL', YH'), the upper-right corner of the superblock is located at (XH', YH'), the bottom-left corner of the superblock is located at (XL', YL'), and the bottom-right corner of the superblock is located at (XH', YL'). The picture width W and the picture height H of the picture may be determined based on the display width and the display height of the display region, respectively. The operation of setting the cross horizontal boundary flag SB_h_cross_boundary_flag may be represented by the following pseudo code.

```
If (XL' < W) && (XH' > W)
    SB_h_cross_boundary_flag = 1
else
    SB_h_cross_boundary_flag = 0
```

The operation of setting the cross vertical boundary flag SB_v_cross_boundary_flag may be represented by the following pseudo code.

```
If (YL' < H) && (YH' > H)
    SB_v_cross_boundary_flag = 1
else
    SB_v_cross_boundary_flag = 0
```

It should be noted that the above example is not meant to be a limitation of the present invention. In an alternative design, the control circuit 502 may be configured to use a different computation algorithm for setting the picture boundary information INF_PB' to indicate whether the superblock is across the picture boundary.

As mentioned above, one superblock with the block size of 64×64 may be split into one or more MI units, where the possible MI unit sizes may correspond to square partitions (e.g., a 64×64-sized block, a 32×32-sized block, a 16×16-sized block, and a 8×8-sized block) as well as non-square partitions (e.g., a 64×32-sized block, a 32×64-sized block, 32×16-sized block, a 16×32-sized block, . . . , a 8×8-sized block). Hence, regarding the boundary MI unit that is nearest to the picture boundary, the width and the height of the boundary MI unit should be determined separately to ensure that the MI unit with the selected MI unit size is not across the picture boundary.

Figure 6:
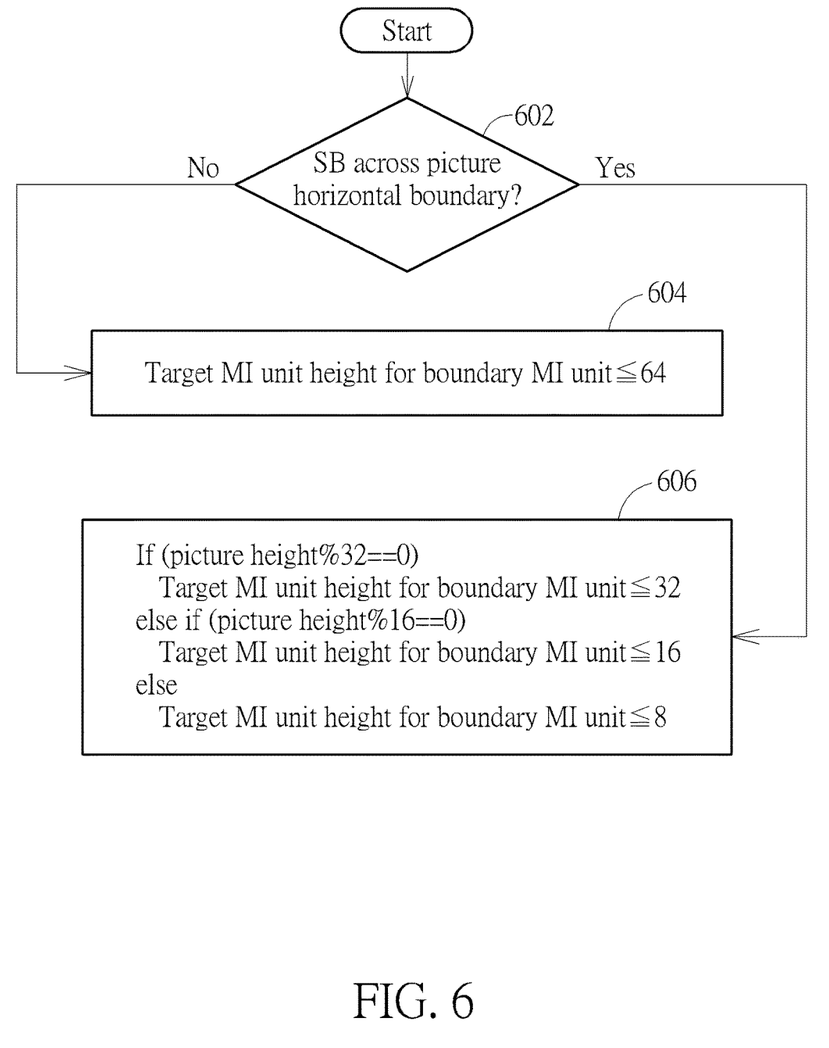
FIG. 6 is a flowchart illustrating a mode information unit height selection method according to an embodiment of the present invention.

FIG. 6 is a flowchart illustrating an MI unit height selection method according to an embodiment of the present invention. The MI unit height selection method may be employed by the size selection circuit 504. The size selection circuit 504 determines a height of an MI unit (which is a boundary MI unit inside a superblock and nearest to the picture boundary) based at least partly on the picture boundary information INF_PB'. In step 602, the size selection circuit 504 refers to the picture boundary information INF_PB' (which may include cross horizontal boundary flag SB_h_cross_boundary_flag and cross vertical boundary flag SB_v_cross_boundary_flag) to determine if the superblock is across the picture horizontal boundary (e.g., PB_H shown in FIG. 4). When the cross horizontal boundary flag SB_h_cross_boundary_flag indicates that the superblock (e.g., $SB_{64 \times 64}\_2$ or $SB_{64 \times 64}\_3$ shown in FIG. 4) is across the picture horizontal boundary (i.e., SB_h_cross_boundary_flag=1), the flow proceeds with step 606. However, when the cross horizontal boundary flag SB_h_cross_boundary_ flag indicates that the superblock (e.g., $SB_{64 \times 64}\_1$ shown in FIG. 4) is fully inside the picture horizontal boundary (i.e., SB_h_cross_boundary_flag=0), the flow proceeds with step 604.

When the superblock is fully inside the picture horizontal boundary, any MI unit defined in the superblock would not be across the picture horizontal boundary. As mentioned above, the possible MI unit sizes may include 64×64, 32×32, 16×16, 8×8, 64×32, 32×64, 32×16, 16×32, . . . , 8×8. Hence, in step 604, the side selection circuit 504 selects a target MI unit height from selectable candidate MI unit height(s), each being equal to or smaller than a maximum possible MI unit height (i.e., 64).

In step 606, an additional limitation may be imposed on the possible MI unit heights 64, 32, 16, 8 to decide selectable MI unit height(s), so as to ensure that an MI unit with a selected MI unit height is not across the picture horizontal boundary. For example, the size selection circuit 504 checks if a height H of the picture is divisible by at least one first candidate MI unit height (e.g., 32 or 16) to generate a checking result, and decides a target MI unit height selected for setting the MI unit size according to the checking result. When the checking result indicates that the height H of the picture is divisible by a first candidate MI unit height (e.g., 32 or 16), the size selection circuit 504 selects the target MI unit height from at least one selectable candidate MI unit height, each being equal to or smaller than the first candidate MI unit height (e.g., 32 or 16). However, when the checking result indicates that the height H of the picture is not divisible by each first candidate MI unit height (e.g., 32 and 16), the size selection circuit 504 selects the target MI unit height from at least one selectable candidate MI unit height, each being equal to or smaller than a second candidate MI unit height such as the minimum possible MI unit height (i.e., 8).

Figure 7:
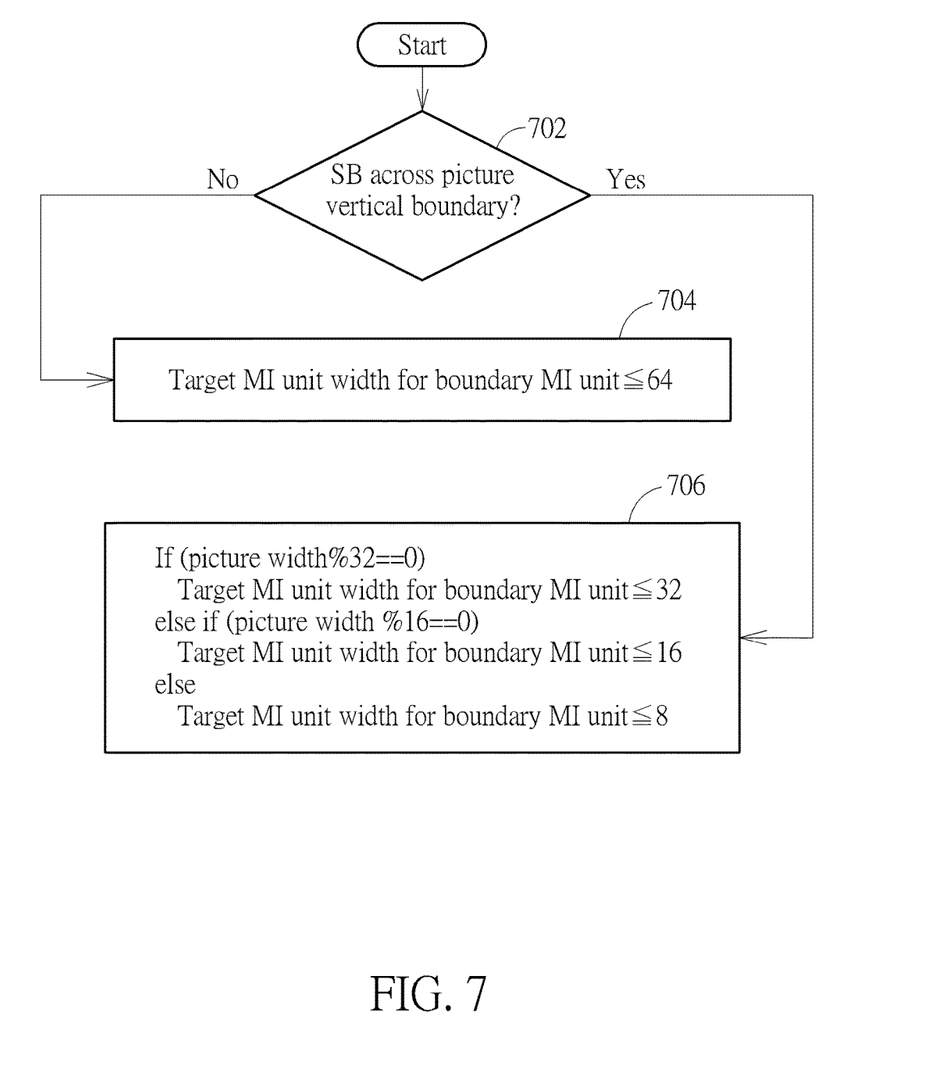
FIG. 7 is a flowchart illustrating a mode information unit width selection method according to an embodiment of the present invention.

FIG. 7 is a flowchart illustrating an MI unit width selection method according to an embodiment of the present invention. The MI unit width selection method may be employed by the size selection circuit 504. The size selection circuit 504 determines a width of an MI unit (which is a boundary MI unit inside a superblock and nearest to the picture boundary) based at least partly on the picture boundary information INF_PB'. In step 702, the size selection circuit 504 refers to the picture boundary information INF_PB' (which may include cross horizontal boundary flag SB_h_cross_boundary_flag and cross vertical boundary flag SB_v_cross_boundary_flag) to determine if the superblock is across the picture vertical boundary (e.g., PB_V shown in FIG. 4). When the cross vertical boundary flag SB_v—cross_boundary_flag indicates that the superblock (e.g., $SB_{64\times64}\_1$ or $SB_{64\times64}\_2$ shown in FIG. 4) is across the picture vertical boundary (i.e., SB_v_cross_boundary_flag=1), the flow proceeds with step 706. However, when the cross vertical boundary flag SB_v—cross_boundary_ flag indicates that the superblock (e.g., $SB_{64\times64}\_3$ shown in FIG. 4) is fully inside the picture vertical boundary (i.e., SB_v_cross_boundary_flag=0), the flow proceeds with step 704.

When the superblock is fully inside the picture vertical boundary, any MI unit defined in the superblock would not be across the picture vertical boundary. As mentioned above, the possible MI unit sizes may include 64×64, 32×32, 16×16, 8×8, 64×32, 32×64, 32×16, 16×32, . . . , 8×8. Hence, in step 704, the side selection circuit 504 selects a target MI unit width from selectable candidate MI unit width(s), each being equal to or smaller than a maximum possible MI unit width (i.e., 64).

In step 706, an additional limitation may be imposed on the possible MI unit widths 64, 32, 16, 8 to decide selectable MI unit width(s), so as to ensure that an MI unit with a selected MI unit width is not across the picture vertical boundary. For example, the size selection circuit 504 checks if a width W of the picture is divisible by at least one first candidate MI unit width (e.g., 32 or 16) to generate a checking result, and decides a target MI unit width selected for setting the MI unit size according to the checking result. When the checking result indicates that the width W of the picture is divisible by a first candidate MI unit width (e.g., 32 or 16), the size selection circuit 504 selects the target MI unit width from at least one selectable candidate MI unit width, each being equal to or smaller than the first candidate MI unit width (e.g., 32 or 16). However, when the checking result indicates that the width W of the picture is not divisible by each first candidate MI unit width (e.g., 32 and 16), the size selection circuit 504 selects the target MI unit width from at least one selectable candidate MI unit width, each being equal to or smaller than a second candidate MI unit width such as the minimum possible MI unit width (i.e., 8).

As mentioned above, one picture may be partitioned into a plurality of superblocks, one superblock may be partitioned into one or MI units, and one MI unit may be partitioned into one or more TUs. In a case where the picture boundary of the picture is set by extending the display boundary of the display region to the nearest value that is an integer multiple of 8, the superblocks, each having a block size of 64×64, are not ensured to be fully inside the picture boundary of the picture. As a result, it is possible that one TU defined in one MI of a superblock that is across the picture boundary is not fully inside the picture boundary. In another alternative design, the picture boundary can be properly set to achieve the same objective of avoiding neighbor pixel padding at the picture boundary before doing intra prediction.

Figure 8:
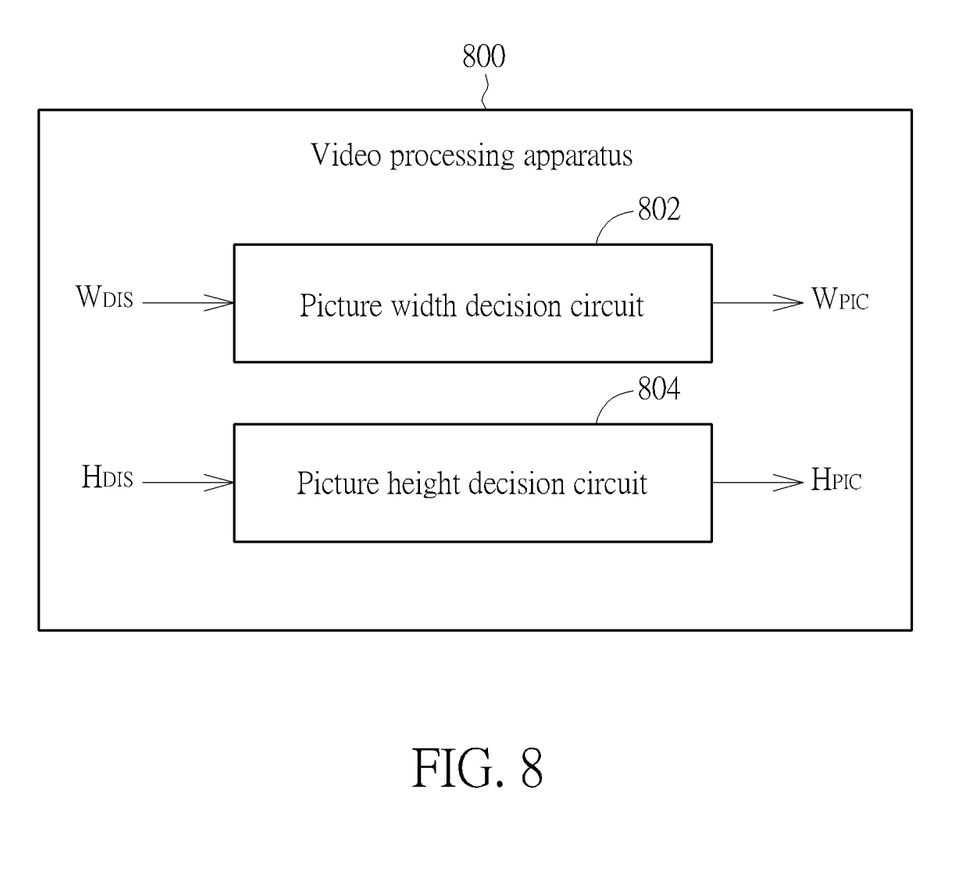
FIG. 8 is a diagram of a video processing apparatus according to a third embodiment of the present invention.

FIG. 8 is a diagram of a video processing apparatus according to a third embodiment of the present invention. The video processing apparatus 800 may be part of an electronic device, such as a personal computer (e.g., a laptop computer or a desktop computer), a mobile phone, a tablet, or a wearable device. The video processing apparatus 800 may be part of a video encoder that is used for encoding raw pictures to generate a video sequence composed of a plurality of consecutive encoded pictures. At least a portion of the video processing apparatus 800 may be implemented in an integrated circuit (IC). To put it simply, any electronic device or electronic system using the proposed video processing apparatus 800 falls within the scope of the present invention.

As shown in FIG. 8, the video processing apparatus (e.g., partial video encoder) 800 includes a picture width decision circuit 802 and a picture height decision circuit 804. The picture width decision circuit 802 is arranged to refer to a display width $W_{DIS}$ of a display region to decide a picture width $W_{PIC}$ of a picture to be encoded. The picture height decision circuit 804 is arranged to refer to a display height $H_{DIS}$ of a display region to decide a picture height $H_{PIC}$ of the picture to be encoded. The display resolution information, including the display width $W_{DIS}$ and the display height $H_{DIS}$, may be set in a container such as MKV or WebM, or may be set in supplemental information in the encoded video bitstream. One superblock (i.e., a 64×64-sized block) is a square partition having a side length equal to 64, where the width and the height of the superblock are equal to the same side length. In a first exemplary design, the picture width $W_{PIC}$ is set by extending the display width $W_{DIS}$ to the nearest value that is an integer multiple of a superblock (SB) side length (i.e., 64). For example, the operation of setting the picture width $W_{PIC}$ may be represented by the pseudo code: picture_width=((display_width+63)>>6)<<6, where ">>" is a right bit-shifting operator, and "<<" is a left bit-shifting operator. Since the picture width $W_{PIC}$ is an integer multiple of the SB side length (i.e., 64), the picture with the picture width $W_{PIC}$ will be partitioned into SBs, each being not across the picture vertical boundary. In this way, any transform unit defined in each MI unit of one SB is ensured to be fully inside the picture vertical boundary, thus requiring no neighbor pixel padding at the picture vertical boundary before doing intra prediction.

In a second exemplary design, the picture height $H_{PIC}$ is set by extending the display height $H_{DIS}$ to the nearest value that is an integer multiple of the SB side length (i.e., 64). For example, the operation of setting the picture height $H_{PIC}$ may be represented by the pseudo code: picture_height= ((display_height+63)>>6)<<6, where ">>" is a right bit-shifting operator, and "<<" is a left bit-shifting operator. Since the picture height $H_{PIC}$ is an integer multiple of the SB side length (i.e., 64), the picture with the picture height $H_{PIC}$ will be partitioned into SBs, each being not across the picture horizontal boundary. In this way, any transform unit defined in each MI unit of one SB is ensured to be fully inside the picture horizontal boundary, thus requiring no neighbor pixel padding at the picture horizontal boundary before doing intra prediction.

In a third exemplary design, the picture width $W_{PIC}$ is set by extending the display width $W_{DIS}$ to the nearest value that is an integer multiple of the SB side length (i.e., 64), and the picture height $H_{PIC}$ is set by extending the display height $H_{DIS}$ to the nearest value that is an integer multiple of the same SB side length (i.e., 64). Since each of picture height $H_{PIC}$ and picture width $W_{PIC}$ is an integer multiple of the SB side length (i.e., 64), the picture with the picture height $H_{PIC}$ and the picture width $W_{PIC}$ will be partitioned into SBs, each not across the picture boundary of the picture. In this way, any transform unit defined in each MI unit of one SB is ensured to be fully inside the picture boundary, thus requiring no neighbor pixel padding at the picture boundary before doing intra prediction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus comprising:
a control circuit, arranged to determine picture boundary information;
a size selection circuit, arranged to refer to at least the picture boundary information to select a size for a block associated with encoding of a picture, wherein the block is only a part of a partition obtained from division of the picture, and when the picture boundary information indicates that the partition is across a picture boundary of the picture, selection of the size is constrained by the picture boundary information to ensure that the block with the selected size is not across the picture boundary of the picture; and
an intra prediction circuit, arranged to apply intra prediction to the block with the selected size.

2. The video processing apparatus of claim 1, wherein the size is a transform unit (TU) size, and the block is a TU inside a mode information (MI) unit.

3. The video processing apparatus of claim 2, wherein the control circuit sets the picture boundary information based on a width of the picture, a height of the picture, and position-related information of the MI unit, where the picture boundary information indicates whether the MI unit is across the picture boundary.

4. A video processing apparatus comprising:
a control circuit, arranged to determine picture boundary information;
a size selection circuit, arranged to refer to at least the picture boundary information to select a size for a block associated with encoding of a picture, wherein selection of the size is constrained by the picture boundary information to ensure that the block with the selected size is not across a picture boundary of the picture; and
an intra prediction circuit, arranged to apply intra prediction to the block with the selected size;
wherein the size is a transform unit (TU) size, and the block is a TU inside a mode information (MI) unit;
wherein when the picture boundary information indicates that the MI unit is across a picture horizontal boundary, the size selection circuit checks if a height of the picture is divisible by at least one first candidate TU side length to generate a checking result, and decides a target TU side length selected for setting the TU size according to the checking result and a size of the MI unit.

5. The video processing apparatus of claim 4, wherein when the checking result indicates that the height of the picture is divisible by a first candidate TU side length, the size selection circuit selects the target TU side length from at least one selectable candidate TU side length, each being equal to or smaller than a minimum among the first candidate TU side length, a width of the MI unit, and a height of the MI unit.

6. The video processing apparatus of claim 4, wherein when the checking result indicates that the height of the picture is not divisible by each first candidate TU side length, the size selection circuit selects the target TU side length from at least one selectable candidate TU side length, each being equal to or smaller than a minimum among a second candidate TU side length, a width of the MI unit, and a height of the MI unit, where the second candidate TU side length is smaller than each first candidate TU side length.

7. A video processing apparatus comprising:
a control circuit, arranged to determine picture boundary information;
a size selection circuit, arranged to refer to at least the picture boundary information to select a size for a block associated with encoding of a picture, wherein selection of the size is constrained by the picture boundary information to ensure that the block with the selected size is not across a picture boundary of the picture; and
an intra prediction circuit, arranged to apply intra prediction to the block with the selected size;
wherein the size is a transform unit (TU) size, and the block is a TU inside a mode information (MI) unit;
wherein when the picture boundary information indicates that the MI unit is across a picture vertical boundary, the size selection circuit checks if a width of the picture is divisible by at least one first candidate TU side length to generate a checking result, and decides a target TU side length selected for setting the TU size according to the checking result and a size of the MI unit.

8. The video processing apparatus of claim 7, wherein when the checking result indicates that the width of the picture is divisible by a first candidate TU side length, the size selection circuit selects the target TU side length from at least one selectable candidate TU side length, each being equal to or smaller than a minimum among the first candidate TU side length, a width of the MI unit, and a height of the MI unit.

9. The video processing apparatus of claim 7, wherein when the checking result indicates that the width of the picture is not divisible by each first candidate TU side length, the size selection circuit selects the target TU side length from at least one selectable candidate TU side length, each being equal to or smaller than a minimum among a second candidate TU side length, a width of the MI unit, and a height of the MI unit, where the second candidate TU side length is smaller than each first candidate TU side length.

10. A video processing apparatus comprising:
a control circuit, arranged to determine picture boundary information;
a size selection circuit, arranged to refer to at least the picture boundary information to select a size for a block associated with encoding of a picture, wherein selection of the size is constrained by the picture boundary information to ensure that the block with the selected size is not across a picture boundary of the picture; and
an intra prediction circuit, arranged to apply intra prediction to the block with the selected size;
wherein the size is a transform unit (TU) size, and the block is a TU inside a mode information (MI) unit;
wherein when the picture boundary information indicates that the MI unit is across a picture horizontal boundary and a picture vertical boundary, the size selection circuit checks if a height and a width of the picture are both divisible by at least one first candidate TU side length to generate a checking result, and decides a target TU side length selected for setting the TU size according to the checking result and a size of the MI unit.

11. The video processing apparatus of claim 10, wherein when the checking result indicates that the height and the width of the picture are both divisible by a first candidate TU side length, the size selection circuit selects the target TU side length from at least one selectable candidate TU side length, each being equal to or smaller than a minimum among the first candidate TU side length, a width of the MI unit, and a height of the MI unit.

12. The video processing apparatus of claim 10, wherein when the checking result indicates that the height and the width of the picture are not both divisible by each first candidate TU side length, the size selection circuit selects the target TU side length from at least one selectable candidate TU side length, each being equal to or smaller than a minimum among a second candidate TU side length, a width of the MI unit, and a height of the MI unit, where the second candidate TU side length is smaller than each first candidate TU side length.

13. The video processing apparatus of claim 1, wherein the size is a mode information (MI) unit size, and the block is an MI unit inside a superblock and nearest to a picture boundary of the picture.

14. The video processing apparatus of claim 13, wherein the control circuit sets the picture boundary information based on a width of the picture, a height of the picture, and position-related information of the superblock, where the picture boundary information indicates whether the superblock is across the picture boundary.

15. A video processing apparatus comprising:
a control circuit, arranged to determine picture boundary information;
a size selection circuit, arranged to refer to at least the picture boundary information to select a size for a block associated with encoding of a picture, wherein selection of the size is constrained by the picture boundary information to ensure that the block with the selected size is not across a picture boundary of the picture; and
an intra prediction circuit, arranged to apply intra prediction to the block with the selected size;
wherein the size is a mode information (MI) unit size, and the block is an MI unit inside a superblock and nearest to a picture boundary of the picture;
wherein when the picture boundary information indicates that the superblock is across a picture horizontal boundary, the size selection circuit checks if a height of the picture is divisible by at least one first candidate MI unit height to generate a checking result, and decides a target MI unit height selected for setting the MI unit size according to the checking result.

16. The video processing apparatus of claim 15, wherein when the checking result indicates that the height of the picture is divisible by a first candidate MI unit height, the size selection circuit selects the target MI unit height from at least one selectable candidate MI unit height, each being equal to or smaller than the first candidate MI unit height.

17. The video processing apparatus of claim 15, wherein when the checking result indicates that the height of the picture is not divisible by each first candidate MI unit height, the size selection circuit selects the target MI unit height from at least one selectable candidate MI unit height, each being equal to or smaller than a second candidate MI unit height, where the second candidate MI unit height is smaller than each first candidate MI unit height.

18. A video processing apparatus comprising:
a control circuit, arranged to determine picture boundary information;
a size selection circuit, arranged to refer to at least the picture boundary information to select a size for a block associated with encoding of a picture, wherein selection of the size is constrained by the picture boundary information to ensure that the block with the selected size is not across a picture boundary of the picture; and
an intra prediction circuit, arranged to apply intra prediction to the block with the selected size;
wherein the size is a mode information (MI) unit size, and the block is an MI unit inside a superblock and nearest to a picture boundary of the picture;
wherein when the picture boundary information indicates that the superblock is across a picture vertical boundary, the size selection circuit checks if a width of the picture is divisible by at least one first candidate MI unit width to generate a checking result, and decides a target MI unit width selected for setting the MI unit size according to the checking result.

19. The video processing apparatus of claim 18, wherein when the checking result indicates that the width of the picture is divisible by a first candidate MI unit width, the size selection circuit selects the target MI unit width from at least one selectable candidate MI unit width, each being equal to or smaller than the first candidate MI unit width.

20. The video processing apparatus of claim 18, wherein when the checking result indicates that the width of the picture is not divisible by each first candidate MI unit width, the size selection circuit selects the target MI unit width from at least one selectable candidate MI unit width, each being equal to or smaller than a second candidate MI unit width, where the second candidate MI unit width is smaller than each first candidate MI unit width.

21. A video processing method comprising:
determining picture boundary information;
utilizing a size selection circuit to refer to at least the picture boundary information to select a size for a block associated with encoding of a picture, wherein the block is only a part of a partition obtained from division of the picture, and when the picture boundary information indicates that the partition is across a picture boundary of the picture, selection of the size is constrained by the picture boundary information to ensure that the block with the selected size is not across the picture boundary of the picture; and applying intra prediction to the block with the selected size.

* * * * *